United States Patent [19]

Saito et al.

[11] Patent Number: 5,323,326
[45] Date of Patent: Jun. 21, 1994

[54] SHAPE DATA PROCESSING METHOD

[75] Inventors: Katsu Saito, Saitama; Tetsuzo Kuragano, Tokyo, both of Japan

[73] Assignee: Sony Corporation, Tokyo, Japan

[21] Appl. No.: 840,936

[22] Filed: Feb. 25, 1992

[30] Foreign Application Priority Data

Feb. 28, 1991 [JP] Japan .................................. 3-058153

[51] Int. Cl.$^5$ .............................................. G06F 15/46
[52] U.S. Cl. ............................ 364/474.24; 364/474.22
[58] Field of Search ................................... 364/188–192, 364/474.22–474.27, 474.29, 474.36, 564; 395/119–143

[56] References Cited

U.S. PATENT DOCUMENTS 4,789,931 12/1988 Kuragano et al. ............. 364/474.35
4,819,192 4/1989 Kuragano et al. ................... 395/121

OTHER PUBLICATIONS

Feinwerktechnik + Messtechnik vol. 98, No. 5, May 1990, Muenchen De pp. CA 146–CA 150 S. Bruno et al. 'Freiformflachen graphisch–interaktiv digitalisieren' *abstract* * pg. CA 147, column 3, line 14–* pg. CA 148, column 3, line 10– * pg. CA 150, column 2, line 21–column 3, line 6 *
IEEE Computer Graphics and Applications vol. 9 No. 1, Jan. 1989, New York US pp. 26–39 R. B. Jerard et al. 'Sculptured surfaces' * the whole document *
NTIS Tech Notes Aug. 1988, Springfield, Va. US pp. 660 1–660 2 'USAETL tests volume computation method' * the whole document *

*Primary Examiner*—Long T. Nguyen
*Assistant Examiner*—Jim Trammell
*Attorney, Agent, or Firm*—Charles P. Sammut

[57] ABSTRACT

Disclosed is a shape data processing method illustratively for use with a CAD,CAM (computed aided design/ computer aided manufacturing) system. The method involves measuring the volume of a target product based on the shape data of that product. In operation, a virtual projection surface is established for the target object to be measured. The surface of the object is divided into small regions. A column portion is formed as an extension from each small region to the projection surface. The volume of the column portion is measured for each small region. The measured volumes are accumulated in accordance with the orientation of the normal vector to each small region. This method allows the volume of the target object to be measured easily and with precision even if the shape thereof is complex.

3 Claims, 15 Drawing Sheets

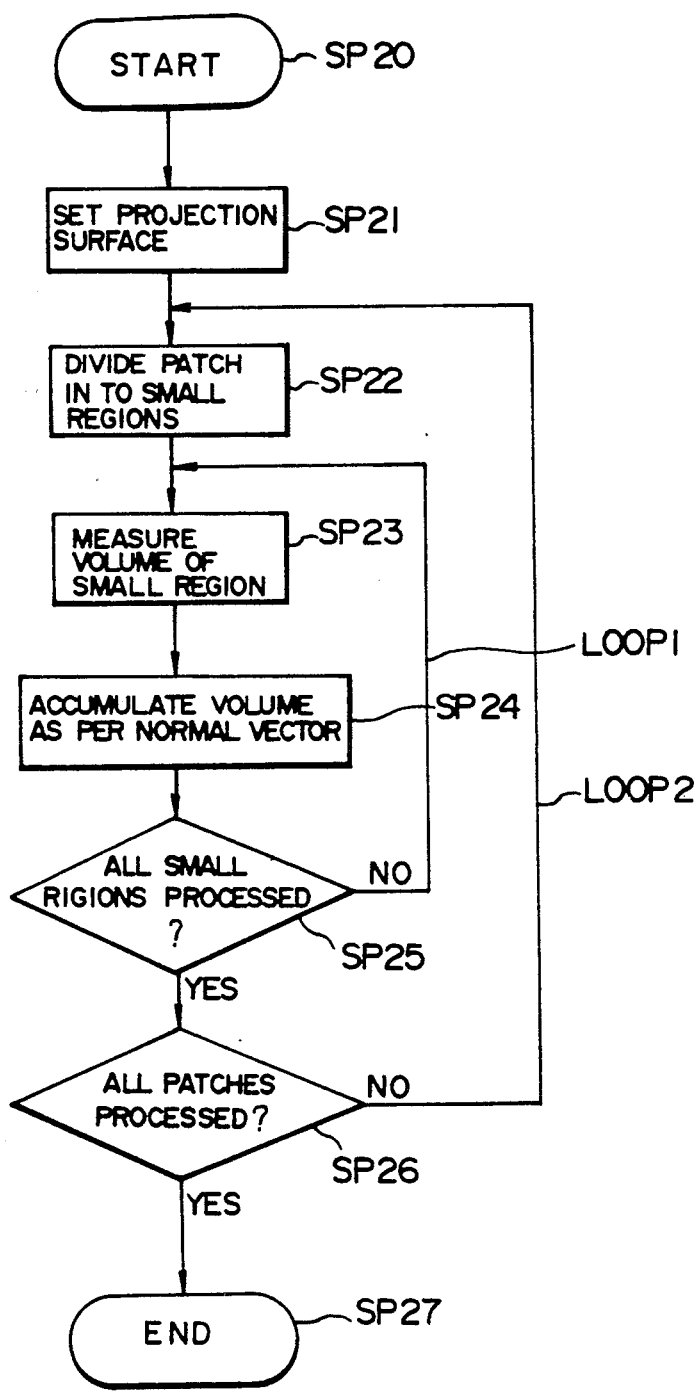

SHAPE DATA PROCESSING METHOD

BACKGROUND OF THE INVENTION

1. Field of the Invention

The present invention relates to a shape data processing method and, more particularly, to a method used by a CAD/CAM (computed aided design/computer aided manufacturing) system in measuring the volume of a product using the shape data thereof.

2. Description of the Prior Art

Heretofore, a number of methods for creating shape data of an object having sculptured surfaces have been proposed (including U.S. Pat. No. 4,789,931 and 4,819,192). These methods create the data by expressing surfaces using vector functions comprising a cubic Bezier equation and by connecting such surfaces under the condition of tangent plane continuation.

As shown in FIG. 19, a designer illustratively designates node vectors P(00), P(03), P(33)1, P(30)1, P(33)2 and P(30)2 in a three-dimensional space. Two spaces are formed using these node vectors, one enclosed by four contiguous node vectors P(00), P(03), P(33)1 and P(30)1, the other by P(00), P(03), P(33)2 and P(30)2. A surface (called a patch) made of these spaces is defined by the following cubic Bezier equation:

$$S(u,v) = (1 - u + u E)^3 (1 - v + vf)^3 \cdot P(00) \qquad (1)$$

which provides a vector S (u, v), where u and v are parameters representing the u and v directions respectively. To the node vector P(00) made of control points, the following equations using shift operators E and F apply:

$$E \cdot P(i,j) = P(i+1, j) (i,j = 0,1,2) \qquad (2)$$

$$F \cdot P(i,j) = P(i, j+1) (i,j = 0,1,2) \qquad (3)$$

$$0 \leq u \leq 1 \qquad (4)$$

$$0 \leq v \leq 1 \qquad (5)$$

Then control point vectors P(01), P(02), P(10)1, P(20)1 to P(23)1, P(31)1 and P(32)1 are set for the space enclosed by the four node vectors P(00), P(03),P(33)1 and P(30)1; vectors P(01), P(02), P(10)2 to P(13)2, P(20)2 to P(23)2, P(31)2 and P(32)2 are set for the space enclosed by the vectors P(00), P(03), P(33)2 and P(30)2. This allows patch vectors S(u, v)1 and S(u, v)2 to be generated for the surface shape determined by the control vectors P(01) through P(32)1 and P(01) through P(32)2 via passage through the four node vectors P(00), P(03), P(33)1 and P(30)1 as well as through the vectors P(00), P(03), P(33)2 and P(30)2.

Furthermore, at the patch vectors S(u, v)l and S(u, v)2, internal control point vectors P(11)1 and P(12)1 as well as P(11)2 and P(12)2, with common control point vectors P(01) and P(02) sandwiched therebetween, are modified and set again. This allows the patch vectors S(u, v)1 and S(u, v)2 to be connected smoothly.

Specifically, the internal control point vectors P(11)1 and P(12)1 as well as P(11)2 and P(12)2 are modified and set again as follows. Using node vectors P(00), P(30)1, P(33)1, P(03), P(33)2 and P(30)2 given by framing, control side vectors a1 and a2 as well as c1 and c2 are set to meet the condition of tangent plane continuation on a boundary curve COM12 of contiguous patch vectors S(u, v)1 and S(u, v)2. These control side vectors are used to modify and set again the internal control point vectors P(11)1 and P(12)1 as well as P(11)2 and P(12)2.

When the above method is applied to the other boundary curves surrounding the patch vectors S(u, v)1 and S(u, v)2, these patch vectors are eventually connected smoothly under the condition of tangent plane continuation with contiguous patches.

In the description above, a tangent plane is a plane formed by tangent vectors in the tl and v directions at various points of the boundary curves. For example, the condition of tangent plane continuation is met when the tangent plane is the same for the patch vectors S(u, v)1 and S(u, v)2 at each of the points on the boundary curve COM12 in FIG. 19.

The condition of tangent plane continuation regarding a point (0, v) on the boundary curve COM12 is determined as depicted in FIG. 20. That is, for the patch vector S(u, v)1, the equation $$n1 = Ha \times Hb \qquad (6)$$

represents a normal vector n1 regarding a tangent vector Ha traversing the boundary curve COM12 (i.e., direction) as well as regarding a tangent vector Hb along the boundary curve COH12 (v direction). For the patch vector S(u, v)2, the equation $$n2 = Hc \times Hb \qquad (7)$$

represents a normal vector n2 regarding a tangent vector Hc traversing the boundary curve COM12 as well as regarding the tangent vector Hb along the boundary curve COM12.

To meet the condition of tangent plane continuation Under the above constraints requires that the tangent vectors Ha and Hb as well as Hc and Hb exist on the same plane. As a result, the normal vectors n1 and n2 are oriented in the same direction.

To satisfy these conditions requires setting the internal control point vectors P(11)1 through P(22)1 and P(11)2 through P(22)2 in such a manner that the equation $$\lambda(v) \frac{\partial S(u,v)1}{\partial u} = \mu(v) \frac{\partial S(u,v)1}{\partial u} + \nu(v) \frac{\partial S(u,v)1}{\partial u} \qquad (8)$$

will hold, where $\lambda(v)$, $\mu(v)$ and $\nu(v)$ are scalar quantities,

As described, where the designer wants to design a certain external shape, parametric vector functions are used to represent the shape through the use of the boundary curves surrounding each framing space involved.

With the external shape thus generated, a metal mold is prepared and products are manufactured therewith. In advance of actual manufacture, it is convenient to know the volume and other data about the product. Illustratively, knowing the product volume affords the benefit of being able to determine how much raw material is needed to produce a given amount of products.

The typical prior art method for obtaining volumes from external shapes has one notable disadvantage. That is, the shape represented by sculptured surfaces tends to be very complex and changes in such a subtle manner that it often defies precise measurement by conventional procedures which are relatively crude in methodology. With some shapes, there is no conventionally feasible way of measuring the volume thereof.

Consider for example a hollow object shown in FIG. 21. Conventional methods are incapable of distinguishing the hollow portion from the actual object portion. It is virtually impossible to automatically measure the volume of such objects.

Then consider variations of the object illustrated in FIG. 22, the object having its top and bottom left open. FIG. 23 shows one variation whose side wall is discontinued. It is difficult conventionally to measure the volume of this variation of the object.

FIG. 24 shows an object formed with its parts overlapping with one another. This type of object occurs when pipes are connected in a complicated manner. These objects are also difficult to measure in terms of volumes.

SUMMARY OF THE INVENTION

It is therefore an object of the present invention to provide a shape data processing method which is simple in steps and easy to use in measuring the volume of a target object with high accuracy.

In carrying out the invention and according to one aspect thereof, there is provided a shape data processing method for expressing a three-dimensional shape of an object M with a surface S(u, v) represented by predetermined shape data DTS, the method comprising the steps of: forming a virtual projection surface K for the object M; dividing the surface S(u, v) represented by the shape data DTS into small regions AR(i, j) following the formation of the virtual projection surface K; detecting the volume dv(u, v) of a column portion H(i, j) extending from each of the small regions AR (i, j) toward the projection surface K; detecting a normal n to each of the small regions AR(i,j); subtracting the volume dv(u, v) of the column portion H(i, j) of a small region AR (i, j) when the normal n thereto is oriented toward the projection surface K; adding the volume dr(u, v) of the column portion H(i, j) of a small region AR(i, j) when the normal n thereto is oriented away from the projection surface K; and obtaining the volume VOL of the object M by use of the results of the addition and of the subtraction.

For each small region AR(i, j), the volume dr(u, v) of the column portion H(i, j) extending therefrom to the projection surface K is detected. If the normal n to the small region AR(i, j) is oriented toward the projection surface K, the volume dr(u, v) of the column portion H(i, j) is subtracted. If the normal n to the small region AR(i, j) is oriented away from the projection surface K, the volume dr(u, v) of the column portion H(i, j) is added. The results of the addition and the subtraction are used to determine the volume VOL of the object M. In this manner, the volume VOL of the object M is precisely obtained regardless of the complexity of the object shape.

These and other objects, features and advantages of the invention will become more apparent upon a reading of the following description and appended drawings.

BRIEF DESCRIPTION OF THE DRAWINGS

FIG. 4 is a flowchart depicting how the total volume of a target object is measured with the embodiment;

DESCRIPTION OF THE PREFERRED EMBODIMENT

A preferred embodiment of the invention will now be described with reference to the accompanying drawings.

(1) Overall configuration of CAD/CAM system

Figure 1:
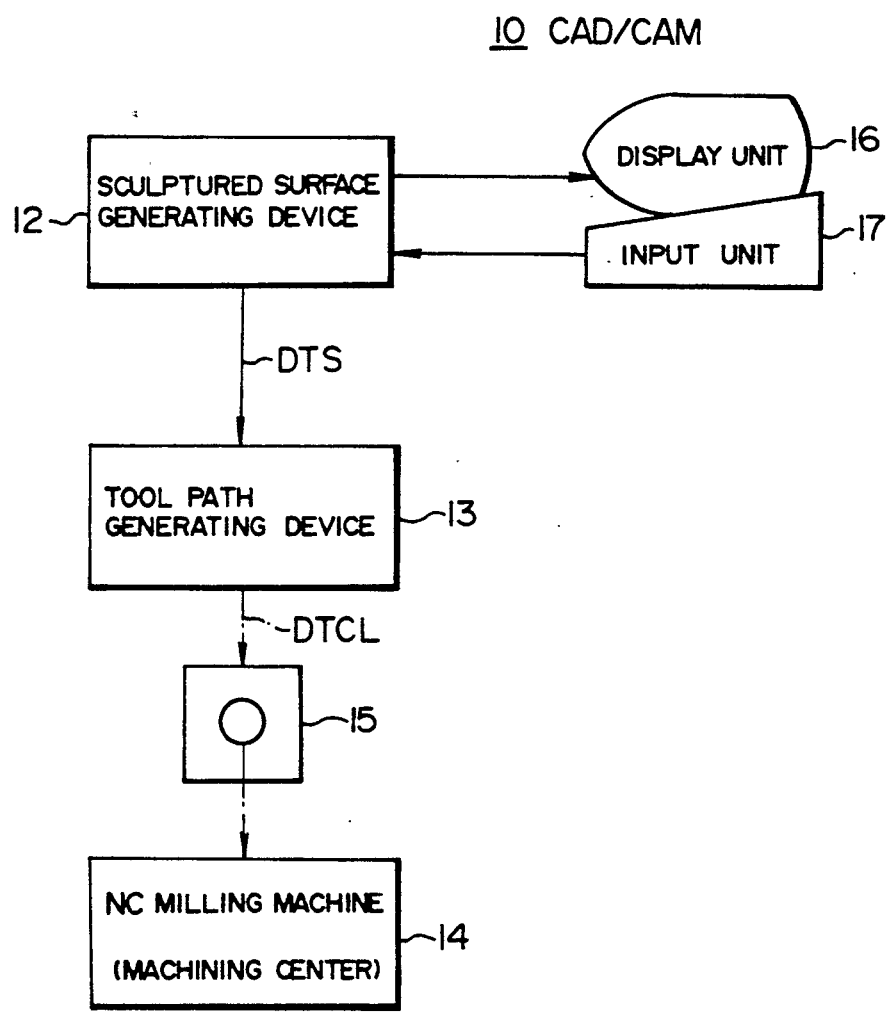
FIG. 1 is a block diagram of a CAD/CAM system embodying the invention.

In FIG. 1, reference numeral 10 represents a CAD/CAM system as a whole. Shape data DTS is prepared by a sculptured surface generating device 12. A tool path generating device 13 uses the shape data DTS to generate manufacturing data DTCL for milling purposes.

The sculptured surface generating device 12 comprises a central processing unit (CPU). In response to indications on a display unit 16, an operator operates an input unit 17 to generate a wire frame model. After patches are formed using a cubic Bezier equation, the patches are connected again to prepare the shape data DTS on the object having the sculptured surface.

Meanwhile, the tool path generating device 13 uses the shape data DTS to prepare the manufacturing data DTCL for roughing and finishing the necessary metal mold. Thereafter, the data DTCL for roughing and finishing is output to an NC milling machine 14 illustratively by use of a floppy disk 15.

The NC milling machine 14 employs the manufacturing data DTCL to drive, say, an NC miller. The miller prepares the metal mold for the product represented by the shape data DTS.

(2) Processing of three-dimensional data

Figure 2:
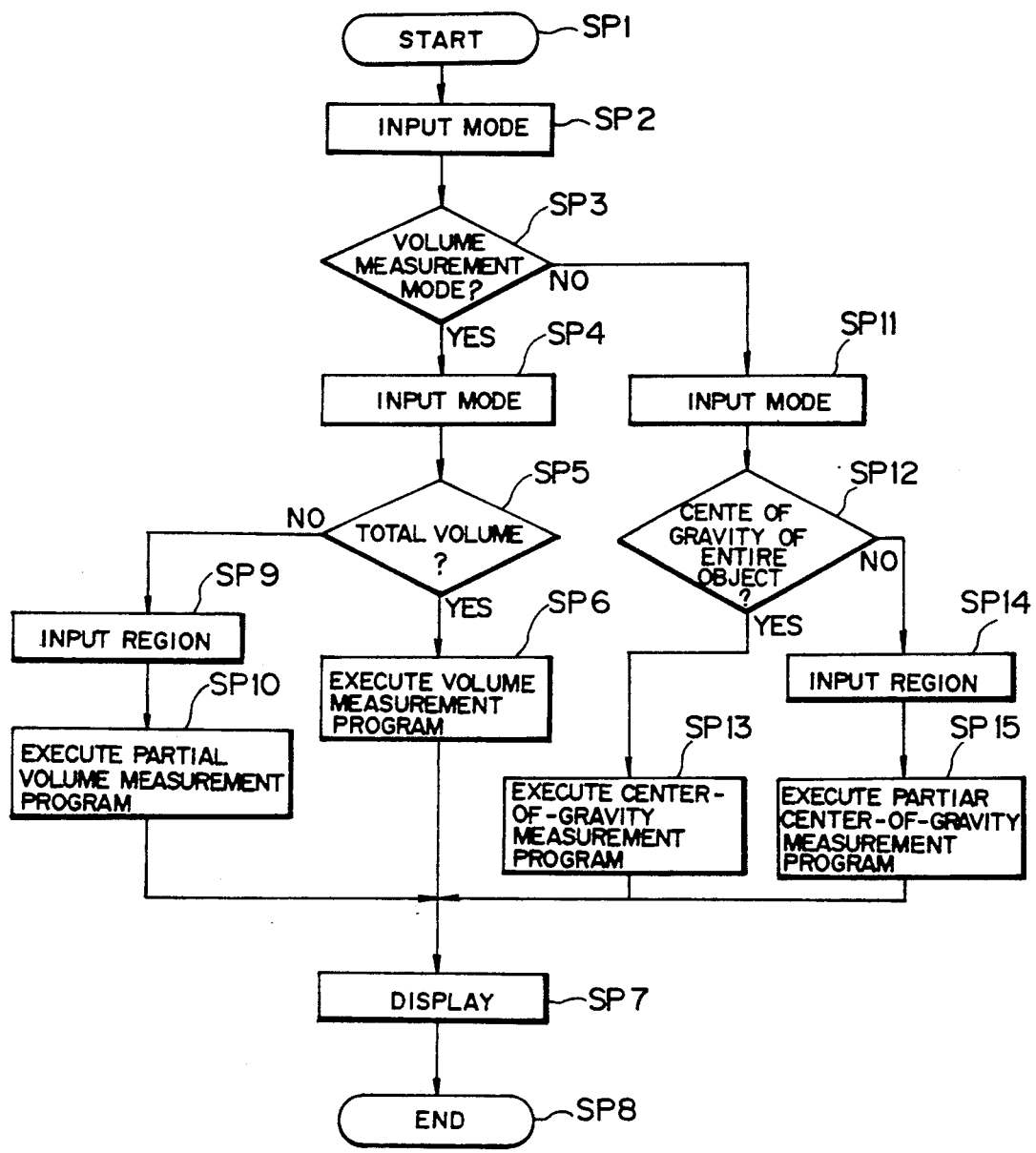
FIG. 2 is a flowchart outlining how the embodiment works in principle.

When the operator operates the input unit 17 to enter measurement mode, the sculptured surface generating device 12 executes the steps outlined in FIG. 2. These steps, when executed, measure the volume or center of gravity of the object represented by the shape data DTS.

After going from step SP1 to step SP2, the sculptured surface generating device 12 displays a measurement mode message on the display unit 16. There, the input of the operator is awaited.

When the operator designates what needs to be measured, the sculptured surface generating device 12 goes to step SP3. In step SP3, a check is made to see if the designated measurement applies to volume measurement mode. If the result of the check in step SP3 is affirmative, the sculptured surface generating device 12 goes to steps SP4 and enters volume measurement mode. Then the input of the operator is awaited. The operator designates the manner of measurement. In response, the sculptured surface generating device 12 goes to step SP0 and checks to see if the total volume of the object is to be measured. If the result of the check in step SP0 is affirmative, step SP6 is reached in which a volume measurement program is executed.

With the volume thus measured, the sculptured surface generating device 12 goes to step SP7 where the result of the measurement is displayed. Step SP7 is followed by step SP8 in which the processing comes to an end.

On the other hand, if the operator designates measurement of the volume only for a part of the target object in step SP4, the sculptured surface generating device 12 makes a "NO" decision in step SP5 and goes from there to step SP9.

At this point, the sculptured surface generating device 12 displays the target object to be measured on the display unit 16 and waits for the operator to act. When the operator designates a particular extent of the target object (e.g., that part of object M sandwiched by planes MH and ML in FIG. 3), step SP10 is reached. In step SP10, a partial volume measurement program is executed.

With the partial volume measured, the sculptured surface generating device 12 goes to step SP7 and displays the result of the measurement. Then step SP8 is reached where the processing is terminated.

If a "NO" decision is made in step SP3, the sculptured surface generating device 12 goes to step SP11 where center-of-gravity measurement mode is entered. Then the input of the operator is awaited. When the operator designates a manner of measurement, the sculptured surface generating device 12 goes to step SP12 and checks to see if the center of gravity for the entire object is to be measured. If the result of the check in step SP12 is affirmative, step SP13 is reached. In step SP13, a center-of-gravity measurement program is executed.

With the center of gravity thus obtained, the sculptured surface generating device 12 goes to step SP7 and displays the result of the measurement.

On the other hand, if the operator designates measurement of the center of gravity only for a part of the target object in step SP11, the sculptured surface generating device 12 makes a "NO" decision in step SP12 and goes to step SP14.

In step SP14, the sculptured surface generating device 12 displays the object of measurement on the display unit 16 and awaits for the operator to effect input. When the operator designates a particular part of the object of which the center of gravity is to be measured, step SP15 is reached. In step SP15, a partial center-ofgravity measurement program is executed.

With the partial center of gravity obtained, the sculptured surface generating device 12 goes to step SP7 and displays the result of the measurement. In the manner described, the invention as embodied above permits measurement of the volume or center of gravity for the entire object or part of the object to be measured.

(2-1) Measurement of volume

The volume of the entire target object is measured by following the steps in FIG. 4.

Figure 5:
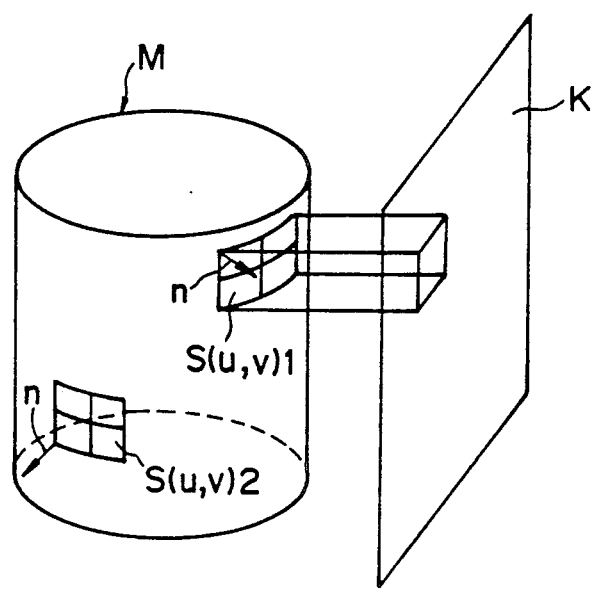
FIG. 5 is a schematic view illustrating how the volume of a target object is measured in principle.

As shown in FIG. 4, the sculptured surface generating device 12 starts its operation in step SP20 and goes to step SP21. In step SP21, the sculptured surface generating device 12 sets a virtual projection surface for the target object. At this point, as depicted in FIGS. 5 and 6, the sculptured surface generating device 12 sets the projection surface K for the target object M so that the entire object will be projected onto the surface K.

Figure 6:
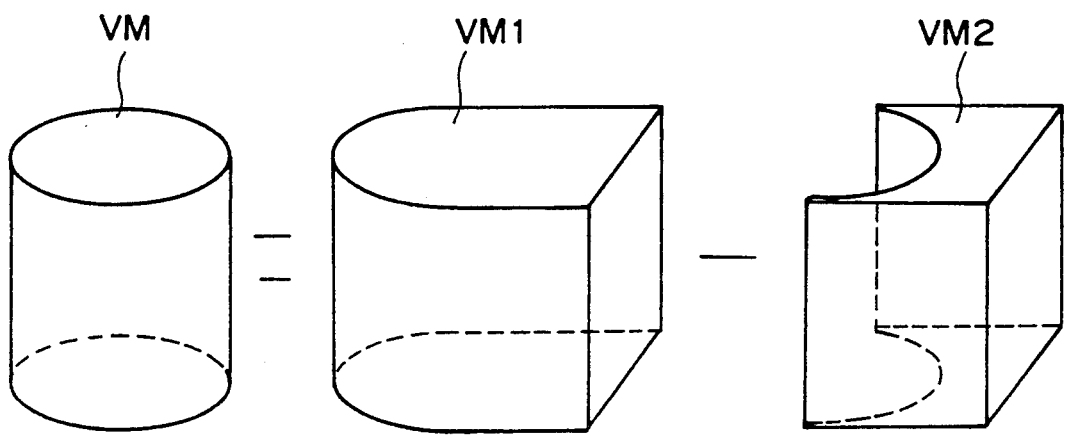
FIG. 6 is a schematic view indicating how the measurement of a volume is eventually attained.

In the setup of FIG. 6, the volume VM of the target object is obtained by subtracting a column volume VM2 from a column volume VM1. The volume VM1 occurs between projection surface K and a surface not facing surface K, and the volume VM2 between projection surface K and a surface facing surface K.

The inventive method as embodied here expresses the shape of the target object using the patch vector $S(u, v)1$ given by a cubic Bezier equation. When the volume of the column portion for each patch is detected and the measurements are accumulated for all patches, the volume of the entire target object is acquired. That is, the volume of the column portion is subtracted for a patch vector $S(u, v)1$ on the virtual surface side; the volume of the column portion is added for a patch vector $S(u, v)2$ on the opposite side.

Figure 21:
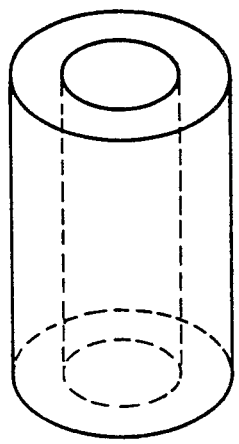
FIG. 21 is a schematic view of a hollow object described in connection with the invention.
Figure 24:
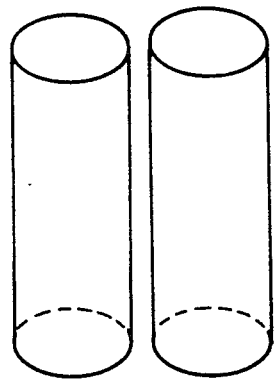
FIG. 24 is a schematic view of an object with its multiple parts overlapping with one another.

A check is made to see if the normal vector n of the current patch vector $S(u, v)$ is oriented toward the virtual surface K. The result of the check determines whether the vector is the patch vector $S(u, v)2$ to be added or the patch vector $S(u, v)1$ to be subtracted. This method permits automatic measurement of the target object regardless of the object being one with a hollow portion, as shown in FIG. 21, or one with overlapping parts, as illustrated in FIG. 24.

Figure 22:
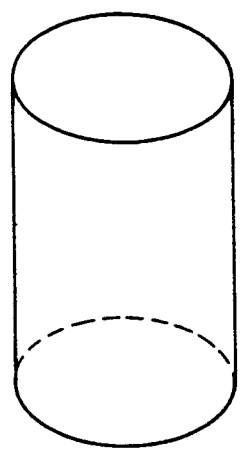
FIG. 22 is a schematic view of an object which has its top and bottom left open, described in connection with the invention.
Figure 23:
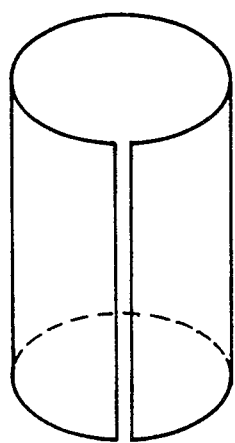
FIG. 23 is a schematic view of an object which has an open side, described in connection with the invention.

For an object which is left open at its top and bottom and which is enclosed by the side wall alone, as the one shown in FIG. 22, the volume of the object is automatically measured by positioning a virtual surface K normal to the currently opened surface. For an object enclosed by discontinuous sides, the volume of the object is roughly measured by establishing a virtual surface in like manner.

Figure 7:
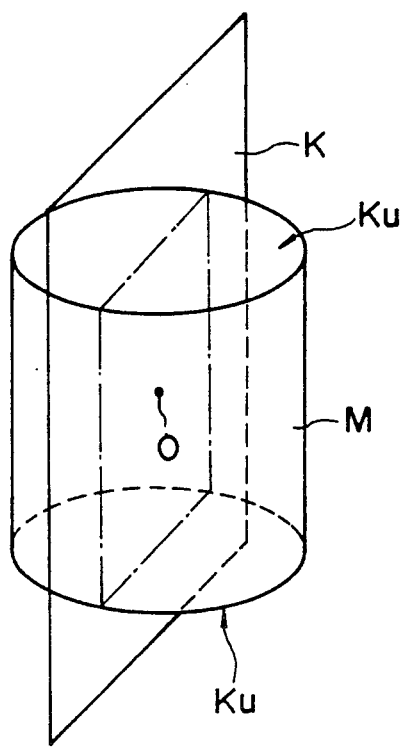
FIG. 7 is a schematic view showing how a projection surface is established.

Operating on the volume measuring principles described, the sculptured surface generating device 12 detects the x, y and z coordinates of the target object as shown in FIG. 7. The maximum and minimum coordinates are averaged so as to establish the center point 0 of the object. A check is made to see if the target object has an opened portion KU. If an opened portion KU is not found, the virtual surface K is set so that the surface K will be in parallel with the y-z plane and will pass through the center point 0.

As the distance increases between target object M and virtual surface K, the volumes of the column portions VM1 and VM2 to be subtracted from the volume VM of the target object M become proportionally greater relative to the latter (FIG. 6). This promotes deterioration in measurement accuracy. By contrast, because this embodiment sets the virtual surface K so that the surface K passes through the center point 0 of the target object, the reduction in measurement accuracy is effectively minimized.

If there exists the opened portion KU, the sculptured surface generating device 12 sets the virtual surface K so that the surface K will pass through the center point 0 and will be perpendicular to the opened portion KU. This allows automated and precise measurement of the volume of the portion opened at its top and bottom and enclosed by the side wall alone.

Figure 8:
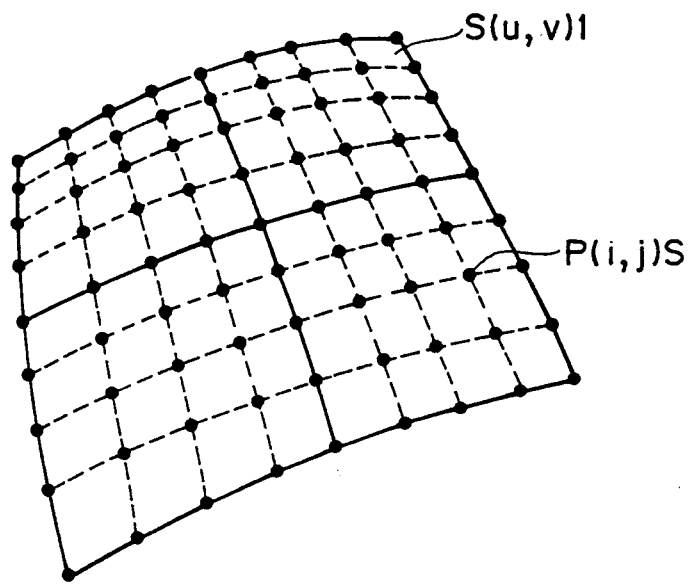
FIG. 8 is a schematic view depicting how a patch of a target object is divided into small regions.

With the projection surface K established as described in step SP21, the sculptured surface generating device 12 goes to step SP22. In step $22, the first patch is divided into parameters. As illustrated in FIG. 8, this processing involves dividing the parameters u and v, which vary between 0 and 1, by a predetermined value (e.g., 40). The divided parameters rs and v are inserted consecutively into Equation (1). This generates a plurality of points P(i, j)S on the patch vector S(u, v).

In this manner, the sculptured surface generating device 12 splits the first patch vector S(u, v)l into 40 divisions in the u and v directions each. The patch vector S(u, v)1 is expressed by 1,600 dividing points P(i, j)s.

Figure 9:
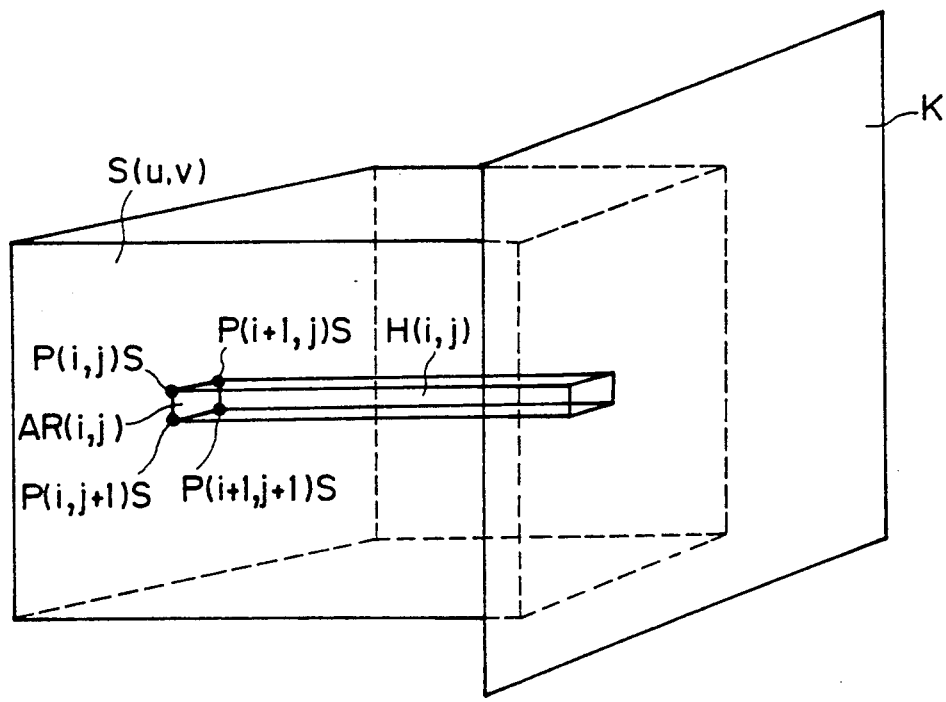
FIG. 9 is a schematic view illustrating how a small region is projected onto the projection surface.

After the patch division, the sculptured surface generating device 12 goes to step SP23. As shown in FIG. 9, a rectangular region AR(i, j), called a small region hereunder and formed by adjacent dividing points P(i, P(i+1, j)S, P(i+1, j+i)S and P(i, J+I)S, is projected onto the virtual surface K. The small region AR(i, j) and virtual surface K constitute a column region H(i, j). The volume dv(u, v) of the column region H(i, j) is then measured.

Figure 10:
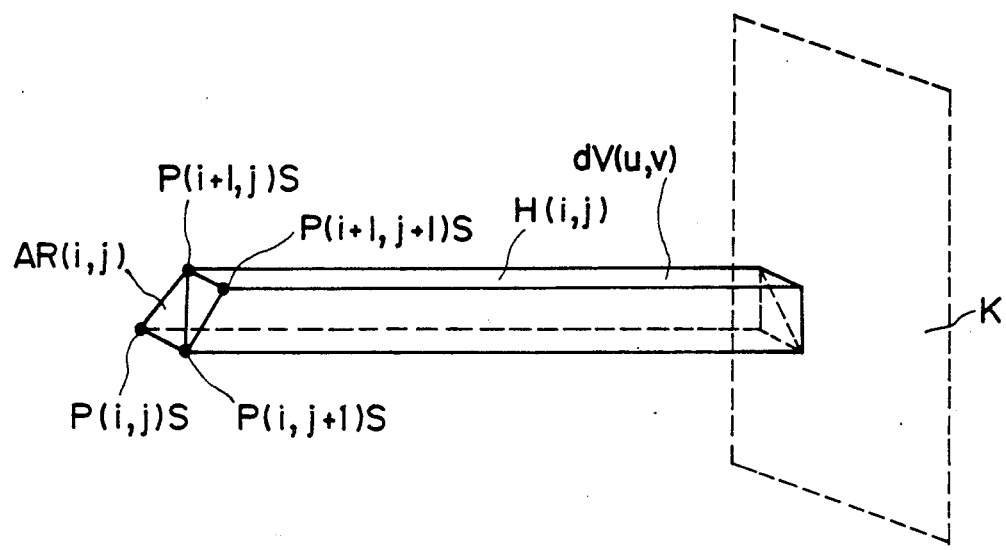
FIG. 10 is a schematic view describing how the volume of a column portion is measured.
Figure 11:
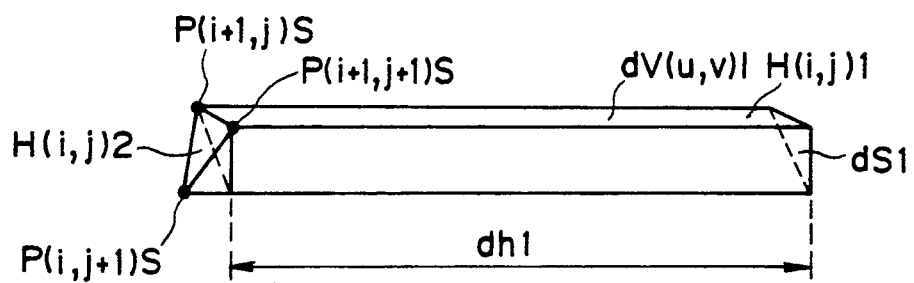
FIG. 11 is a schematic view of how a column portion is divided into two parts, one being a triangular prism shown herein.
Figure 12:
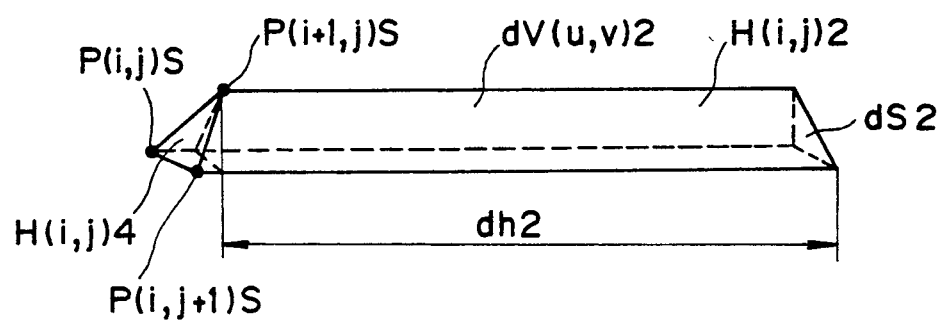
FIG. 12 is a schematic view indicating the other part resulting from the division of FIG. 11.
Figure 14:
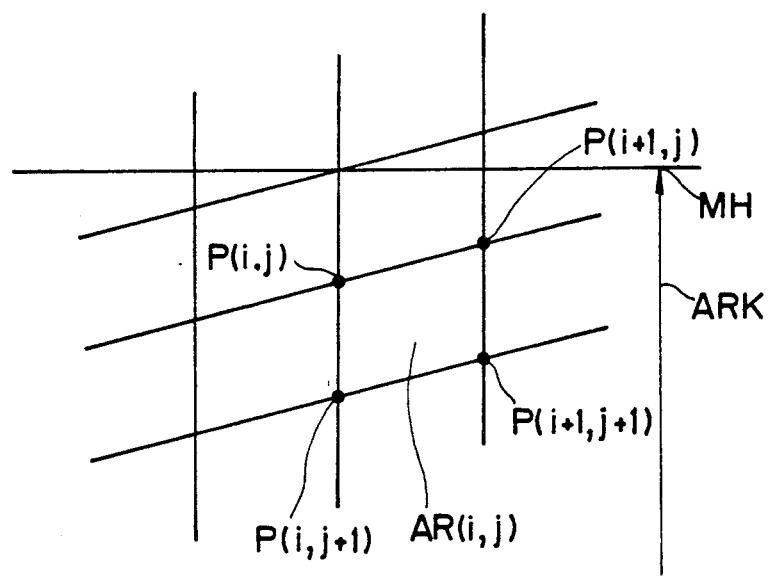
FIG. 14 is a schematic view showing a small region contained in a target portion for measurement.

As illustrated in FIGS. 10 through 12, the sculptured surface generating device 12 divides the column region H(i, j) into two triangular section column regions H(i, j)l and H(i, j)2, and further divides each of these regions H(i, j)1 and H(i, j)2 into a triangular prism and a triangular pyramid. The sculptured surface generating device 12 then finds the volumes of the triangular prism and triangular pyramid constituting each of the column regions H(i, j)1 and H(i, j)2, arid accumulates the obtained volumes to determine the volume dr(u, v) of the column region H(i, j).

With the volume dr(u, v) of the column region H(i, j) thus acquired, the sculptured surface generating device 12 goes to step SP24. In step SP24, the direction of the normal vector n is detected. That is, the sculptured surface generating device 12 detects the direction of the normal vector n for the small region AR(u, v) whose volume is measured. When the angle $\theta$ between normal vector n and virtual surface K falls within the range of $$0 \leq \theta \leq 90 \tag{9}$$

then the volume dr(u, v) measured for the current small region AR(i,j) ls multiplied by a factor of $-1$.

On the other hand, if the angle $\theta$ between normal vector n and virtual surface K falls within the range of $$90 < \theta \leq 180 \tag{10}$$

then the volume dr(u, v) measured for the current small region AR(i, j) ls kept unchanged.

The sculptured surface generating device 12 adds the volume dr(u, v) to the volume accumulated so far. Thereafter, the device 12 goes to step SP25.

In step SP25, the sculptured surface generating device 12 checks to see if the volume measurement for all small regions of the first patch vector S(u, v) has been completed. If the result of the check is negative, step SP23 is again reached where the volume of the next small region is measured. If the volume measurement for all small regions has been completed and the result of the check in step SP2 is affirmative, the sculptured surface generating device 12 goes to step In this manner, the sculptured surface generating device 12 repeats a loop of steps SP23, SP2, SP2 and SP2 (LOOPS) regarding the first patch vector S(u, v). This means executing the processing represented by the equation $$90 < \theta \leq 180 \tag{11}$$

where, norm( i/40 , j/40 ) stands for a multiplier of $-1$ when the relationship (9) above is satisfied , and for a multiplier of 1 when the relationship (10) is met.

As described, the sculptured surface generating device 12 accumulates the volumes of the column portions formed by projecting the first patch vector S(u, v) onto the projection surface K. The accumulation is carried out with reference to the normal vector n and, when completed, determines the volume of the target object in the first patch vector S(u, v). Specifically, Equation (11) is approximated by Equation $$Vp(i) = \sum_{i=0}^{40} \sum_{j=0}^{40} dv(i/40,j/40) \cdot \text{norm}(i/40,j/40) \tag{12}$$

which provides $$Vp(i) = \int_0^1 \int_0^1 dv(u,v) \cdot \text{norm}(u,v) du dv \tag{13}$$
$$= \int_0^1 \int_0^1 S(u,v) \cdot h(u,v) \cdot \text{norm}(u,v) du dv$$

Thus the desired volume is eventually obtained. In Equation (13), h(U, v) stands for the distance between patch vector S(u, v) and projection surface K.

In step SP26, the sculptured surface generating device 12 checks to see if the volume measurement for all patches of the target object has been completed. If the result of the check is negative, step SP22 is reached again.

Thus the sculptured surface generating device repeats a loop of steps SP22, LOOP1, SP 26 and SP22 (LOOP2) to accumulate the volumes of all patches of the target object. In this manner, the volume of the target object represented by the equation $$VOL = \sum_{i=1}^{n} Vp(i) \tag{14}$$

is obtained.

As described, the invention as embodied above divides the patch vector S(u, v) into 1,600 small regions. Each of the small regions is projected onto the virtual projection surface so as to determine its volume. With the individual measurements accumulated, the volume of the target object is obtained with sufficiently high accuracy. The sculptured surface generating device 12 then goes to step SP27 where the processing comes to an end.

Figure 3:
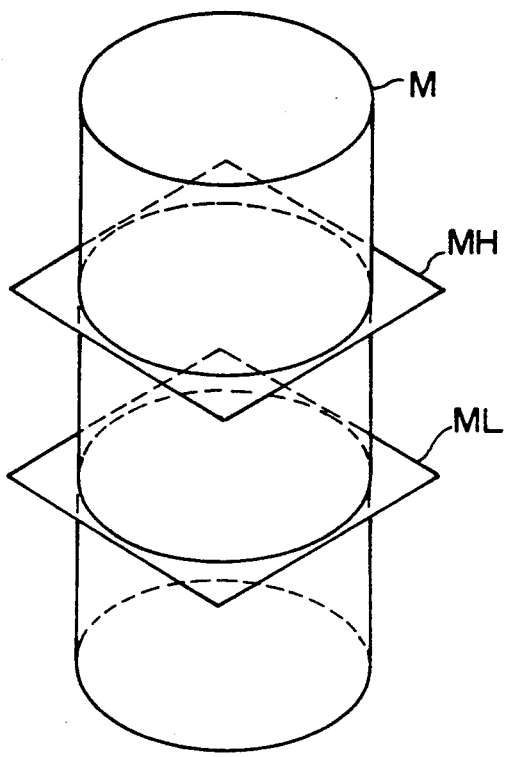
FIG. 3 is a schematic view depicting how part of a target object is measured with the embodiment.

(2-2) Partial measurement of volumes

Where the operator designates a particular portion of the target object for measurement, as shown in FIG. 3, the sculptured surface generating device 12 goes to step SPi0 and executes the partial volume measurement program.

Figure 13:
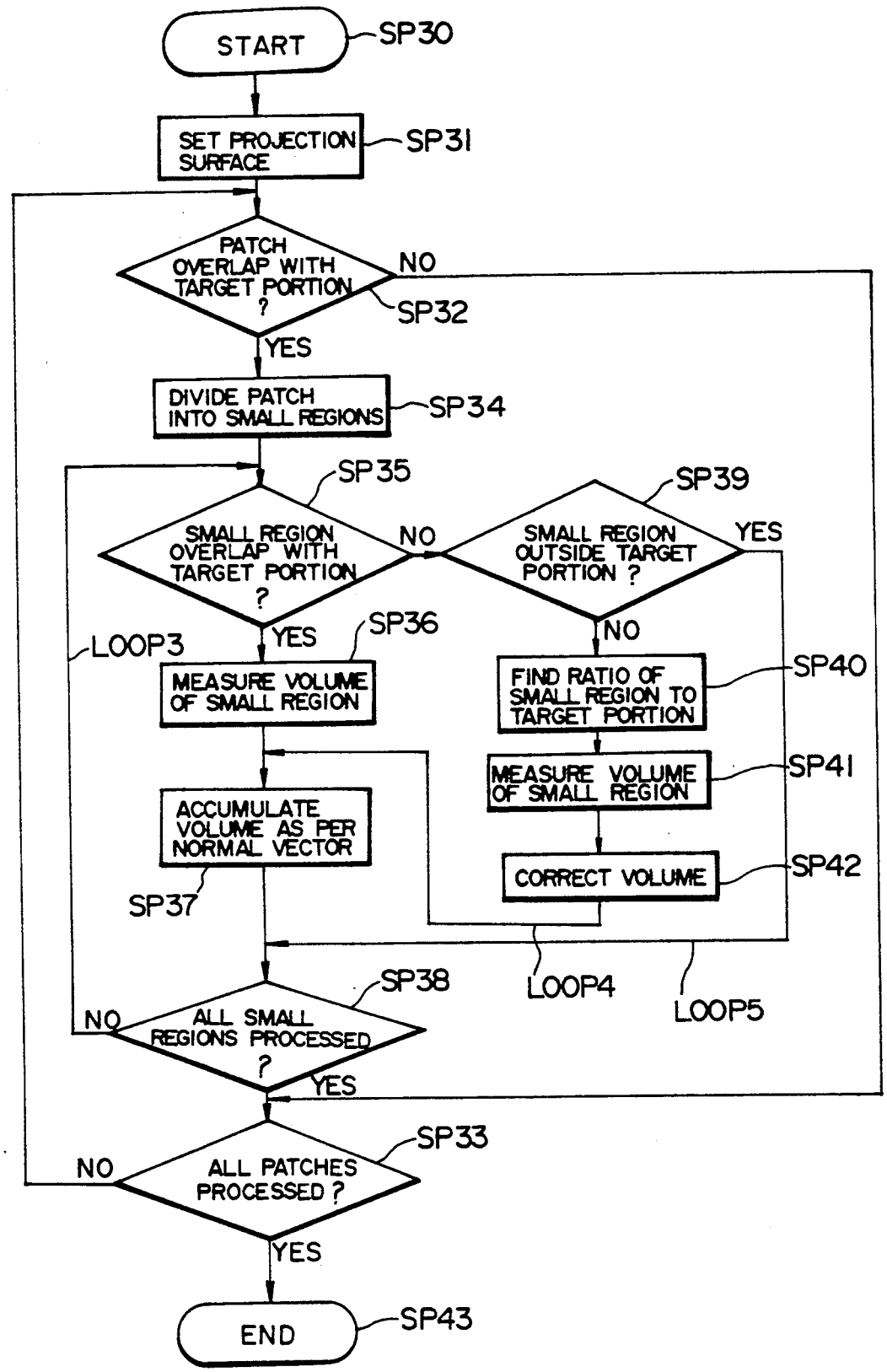
FIG. 13 is a flowchart describing how a partial volume of a target object is obtained with the embodiment.

By following the steps outlined in FIG. 13, the sculptured surface generating device 12 measures the volume of that part of the target object which is designated by the operator. Specifically, the sculptured surface generating device 12 starts from step SP30 and goes to step SP31. In step SP31, a projection surface K is established. Here, the operator may illustratively designate planes MH and ML (FIG. 3) in parallel with the x-y plane in order to find the volume of the portion sandwiched by the two planes MH and ML. In this case, the projection surface K is set perpendicular to the planes MH and ML.

At this point, the coordinate data on the portion delimited by the planes MH and ML are detected. The maximum and minimum values of the coordinate data are averaged so that the projection surface K, when established, will pass through the center of the delimited portion. In this manner, the sculptured surface generating device 12 effectively avoids deterioration in measurement accuracy.

The sculptured surface generating device 12 then goes to step SP32. In step SP32, a check is made to see if any part of the first patch vector S(u, vl)l overlaps with the target portion sandwiched by the planes MH and ML. If the result of the check in step sp32 is negative, the sculptured surface generating device 12 goes to step SP33. In step SP33, a check is made to see if the processing for all patches has been completed. If the result of this check is negative, step SP32 is reached again, and the next patch is processed.

As described, the sculptured surface generating device 12 measures the volumes of only the patches included in the target portion of the object. The volume of the portion designated by the operator is obtained in this manner.

If a "YES" decision is made in step SP32, the sculptured surface generating device 12 goes to step SP34. In step SP34, the patch is divided into parameters as in step SP22 and small regions are generated therefrom.

The sculptured surface generating device 12 then reaches step SP35. In step SP35, a check is made to see if the small region RA(i, j) is located in the target portion of the object. Where the dividing points P(i, j)S, P(i, j+i)S, P(i+1, J)S and P(i+1, j+1)S are all found to be inside the target portion ARK, the result of the check in step SP35 is affirmative. In that case, step SP35 is followed by step SP36.

In step SP36, the sculptured surface generating device 12 measures the volume of the current small region AR(i, j), and goes to step SP3? where the measurements are accumulated in accordance with the orientation of the normal vector. Going to step SP38, the sculptured surface generating device 12 checks to see if the volumes of all small regions have been obtained. If the result of the check in step SP38 is negative, step SP30 is reached again.

As described, the sculptured surface generating device 12 checks to see if each of the small regions is located within the target portion ARK. For each small region, the device 12 carries out steps SP35, SP36, SP37, SP38 and SP35, in that order (LOOP3). The loop is repeated in the same manner as depicted in FIG. 4, and the volumes of the small regions are accumulated.

If a "NO" decision is made in step SP35, the sculptured surface generating device 12 goes to step SP39. In step SP39, a check is made to see if the current small region is located outside the target portion ARK.

Figure 15:
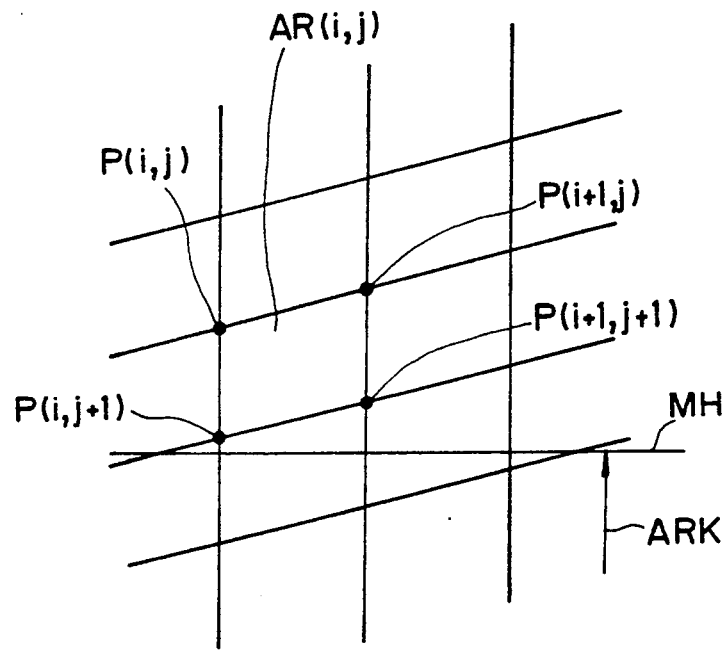
FIG. 15 is a schematic view illustrating a small region existing outside a target portion for measurement.

If none of the dividing points P(i, j)S, P(i+1, j)S, P(i, j+I)S and P(i+1, j+i)S is found within the target portion ARK, as illustrated in FIG. 15, the result of the check in step SP39 is affirmative. In that case, the sculptured surface generating device 12 goes to step SP37 and checks to see if the volumes of all small regions have been obtained. If the check of step SP37 yields a "NO" decision, step SP32 is reached again.

On the other hand, if the dividing points P(i, j)S, P(i+1, j)S, P(i, j+I)S and P(i+1, j+I)S constituting the small region AR(i, j) are located across a plane traversing the target portion ARK, the result of the check in step SP39 is negative. In that case, the sculptured surface generating device 12 goes to step SP40.

Here, the sculptured surface generating device 12 projects the dividing points P(i, j)S, P(i+1, j)S, P(i, j+i)S and P(i+1, j+I)S onto the projection surface K. The device 12 then has the boundary MH of the target portion ARK internally divide straight lines between projected dividing points P(i, j)S and P(i+1, j)S, between P(i, j)S and P(i, j+i)S, between P(i+1, j)S and P(i+1, j+i)S, and between P(i, j+i)S and P(i+1, j+I)S in order to find the internal ratios involved. Using the results obtained, the sculptured surface generating device 12 finds the ratio of how much of the small region AR(i, j) is contained in the target portion ARK.

The sculptured surface generating device 12 then goes to step SP41. In step SP41, the device 12 measures the volume of the small region AR(i, j). After this, the sculptured surface generating device 12 goes to step SP42 and corrects the acquired volume using the ratio previously detected. In this manner, the sculptured surface generating device 12 acquires the volume of that part of the small region AR(i, j) which is contained in the target portion ARK. Thereafter, step SP37 is reached.

The sculptured surface generating device 12 repeats LOOP3, LOOP4 (steps SP35, SP39, SP40, SP41, SP42, SP37, SP38 and SP35, executed in that order) or LOOP5 (steps SP35, SP39, SP38 and SP35, executed in that order) until the volumes of all small regions have been obtained. This yields a "YES" decision in step SP38, which is followed by step SP33.

When all patches have been processed, the result of the check in step SP33 becomes affirmative. This allows the sculptured surface generating device 12 to reach step SP43 where the processing comes to an end. In this manner, the sculptured surface generating device 12 measures easily and dependably the volume of the region designated by the operator.

(2-3) Measurement of center of gravity

In step SP11 of FIG. 2, the operator may designate measurement of the center of gravity for the entire target object. This yields a "YES" decision in step SP12. In that case, the sculptured surface generating device 12 goes to step SP13 where the center-of-gravity measurement program is executed.

Figure 17:
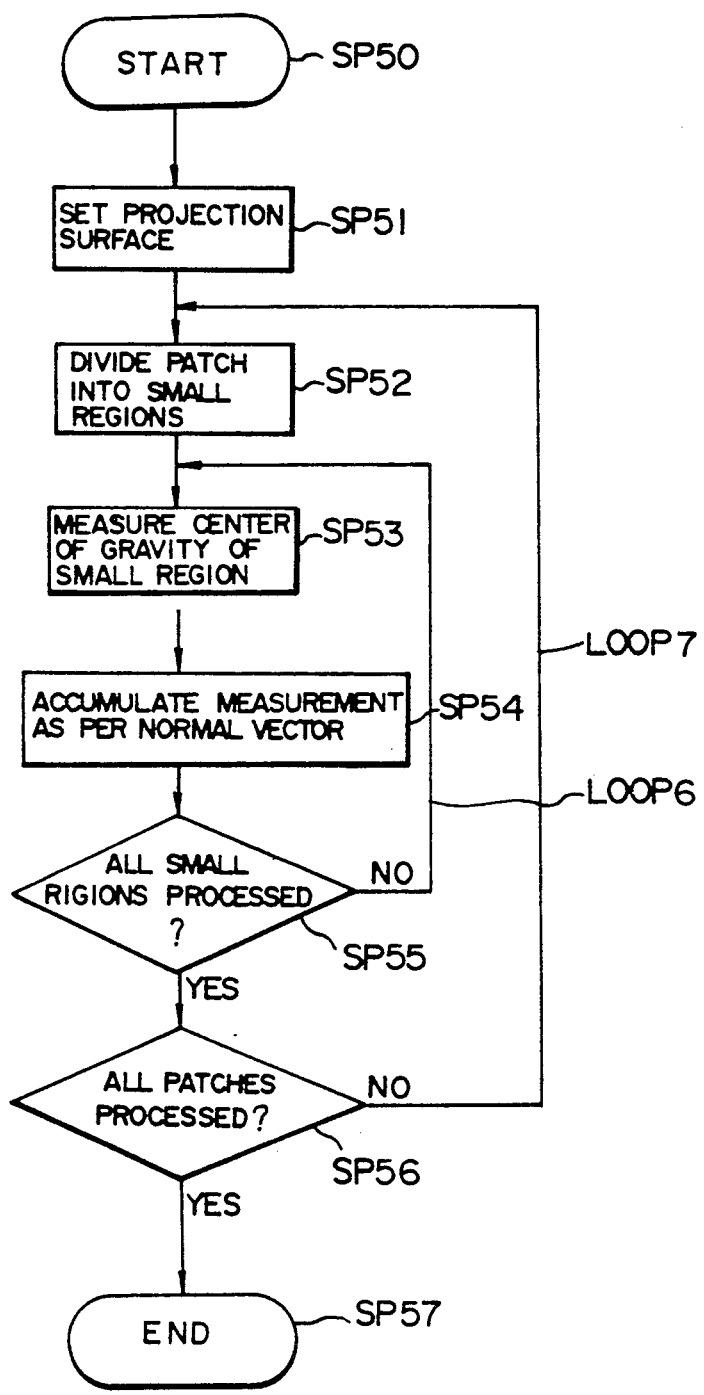
FIG. 17 is a flowchart describing how the center of gravity of the entire target object is measured with the embodiment.

Specifically, the sculptured surface generating device 12 carries out the steps of FIG. 17 in order to find the center of gravity of the object designated by the operator. The sculptured surface generating device 12 starts its operation in step SP50 and goes to step SP51. As with volume measurement, the device 12 establishes the projection surface K in step SP51.

The sculptured surface generating device 12 then goes to step SP52. In step SP52, the first patch is divided into parameters. Step SP52 is followed by step SP53 in which is detected the center of gravity for the column region H(i, j) formed between small region AR(i, j) and virtual surface K. In this case, as with volume measurement, the sculptured surface generating device 12 divides the column region into two triangular section column regions, and each of the two column regions into a triangular prism and a triangular pyramid.

The sculptured surface generating device 12 then measures the center of gravity of both the triangular prism and the triangular pyramid. After this, the measurements are multiplied by the volumes involved. Assume that the centers of gravity are cg(u, v)1t, cg(u, v)2t, cg(u, v)1s and cg(u, v)2s for the triangular prism and triangular pyramid portions constituting the triangular section column regions, and that the volumes are dr(u, v)1t, dr(u, v)2t, dr(u, v)1s and dr(u, v)2s for the same portions. Given these assumptions, the equation $$cg(i,j) = \frac{1}{dr(u,v)} (cg(u,v)1t \cdot dr(u,v)1t + cg(u,v)2t \cdot dr(u,v)2t + \quad (15)$$
$$cg(u,v)1s \cdot dr(u,v)1s + cg(u,v)2s \cdot dr(u,v)2s)$$

is executed to find the center of gravity cg(u, v) and volume dr(u, v) regarding the upper part of the column portion.

The sculptured surface generating device 12 then goes to step SP54. In step SP54, the direction of the normal vector n is detected and, as with the volume measurement program, the volumes dr(u, v) measured with reference to the normal vector n are accumulated. At the same time, using the volume thus obtained, the sculptured surface generating device 12 executes the equation $$cgdv = cg(u,v) \cdot dr(u,v) \cdot norm(u,v) \quad (16)$$

to find the center of gravity cg(u, v). The center of gravity cg(u, v) is weighted by the volume dr(u, v). The result is added and accumulated in accordance with the direction of the normal vector.

Thereafter, the sculptured surface generating device 12 goes to step SP55. In step 8P55, a check is made to see if the centers of gravity and the volumes of all small regions in the first patch vector S(u, v)l have been measured. If the result of the check in step SP55 is affirmative, step SP53 is again reached in which the center of gravity and the volume of the next small region are measured.

If the centers of gravity and the volumes of all small regions have been measured, step SP55 yields a "YES" decision. This allows the sculptured surface generating device 12 to go to step SP56.

The sculptured surface generating device 12 then repeats steps SP53, SP54, SP55 and SP53, in that order (LOOP6), on the first patch vector S(u, v)l, to execute the equation $$cgdv(i) = \sum_{i=0}^{40} \sum_{j=0}^{40} cg(i/40,j/40) \cdot dr(i/40,j/40) \cdot \text{norm}(i/40,j/40) \quad (17)$$

while carrying out the processing of Equation (11).

In this manner, the sculptured surface generating device 12 acquires a weighted center of gravity cgdv(i). This is an accumulated result regarding the column region formed by projecting the first patch vector S(u, v)l onto the projection surface K, the result being obtained by weighting by the volume dr(u, v) the center of gravity cg(u, v) of each small region with reference to the orientation of the normal vector n.

In step SP56, a check is made to see if the centers of gravity and the volumes of all patches making up the target object have been measured. If the result of this check is negative, step SP52 is again reached.

Thus the sculptured surface generating device 12 repeats steps SP52, LOOP6, SP56 and SP52, in that order (LOOP7). In this manner, the device 12 finds the accumulated result VOL1 given by the equation $$\text{VOL1} = \sum_{i=1}^{n} cgdv(i) \cdot VP(i) \quad (18)$$

as well as the total volume VOL given by Equation (14).

When the accumulated results of all patches have been obtained, the sculptured surface generating device 12 makes a "YES" decision in step SP56. Going to step SP07, the device 12 executes the equation $$Cg = \frac{\text{VOL1}}{\text{VOL}} \quad (19)$$

to terminate this processing.

As described, the center of gravity of each of the column portions making up each small region is obtained. After this, the centers of gravity obtained are weighted by the respective volumes when added up. The result is divided by the total volume. This provides the center of gravity for the entire target object.

When the weighted addition is carried out with reference to the orientation of the normal vector n, the center of gravity is obtained relative to the projection surface K as in the case of acquiring volume. Thus the center of gravity of a target object is readily and reliably obtained even if the target is complex in shape.

(2-4) Partial measurement of center of gravity

When the operator designates a target portion for measurement (FIG. 3) in step SP14, the sculptured surface generating device 12 goes to step SP15. In step SP15, the partial center-of-gravity measurement program is executed.

Figure 18:
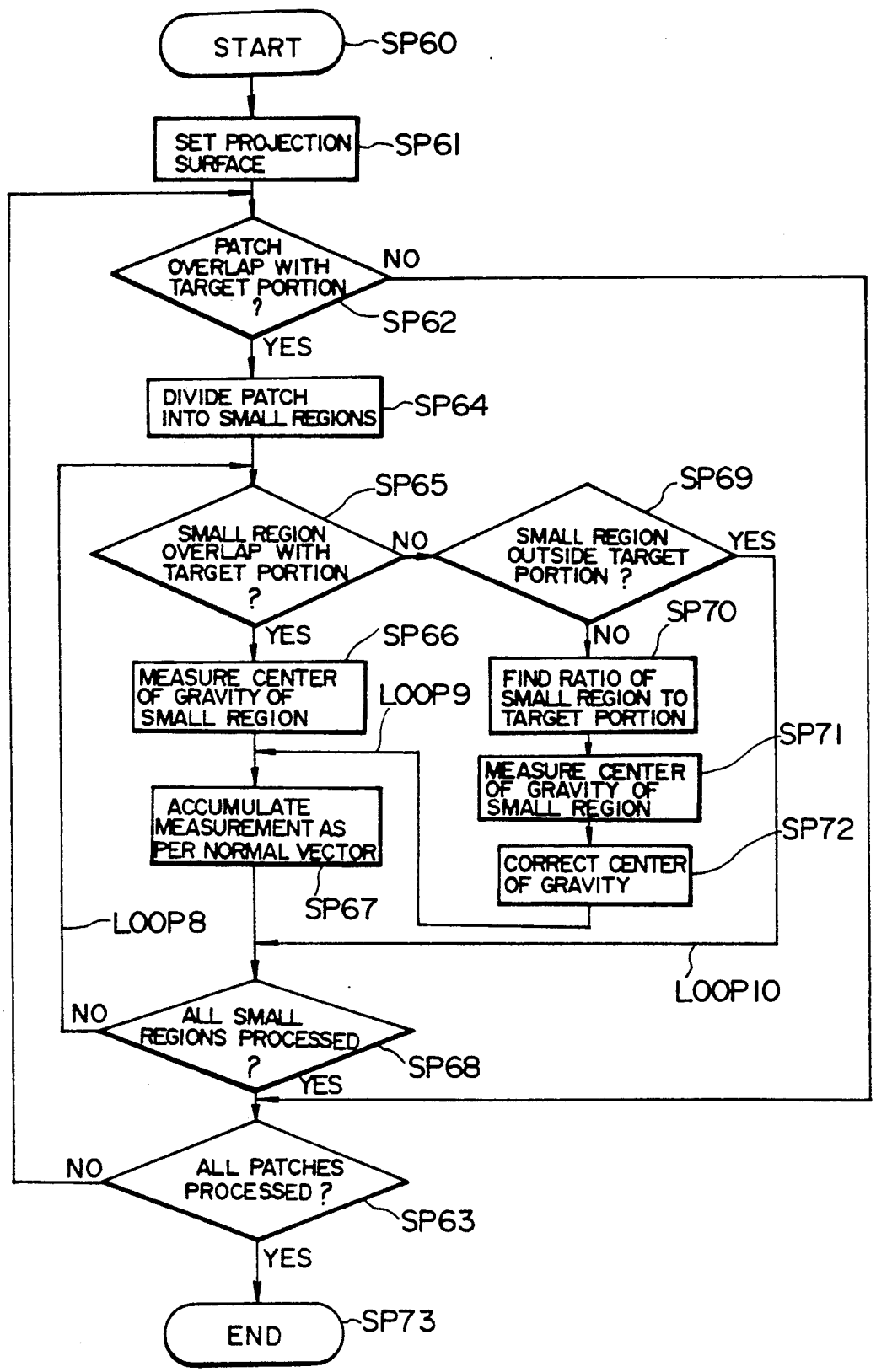
FIG. 18 is a flowchart showing how the center of gravity of a part of the target object is measured with the embodiment.
Figure 19:
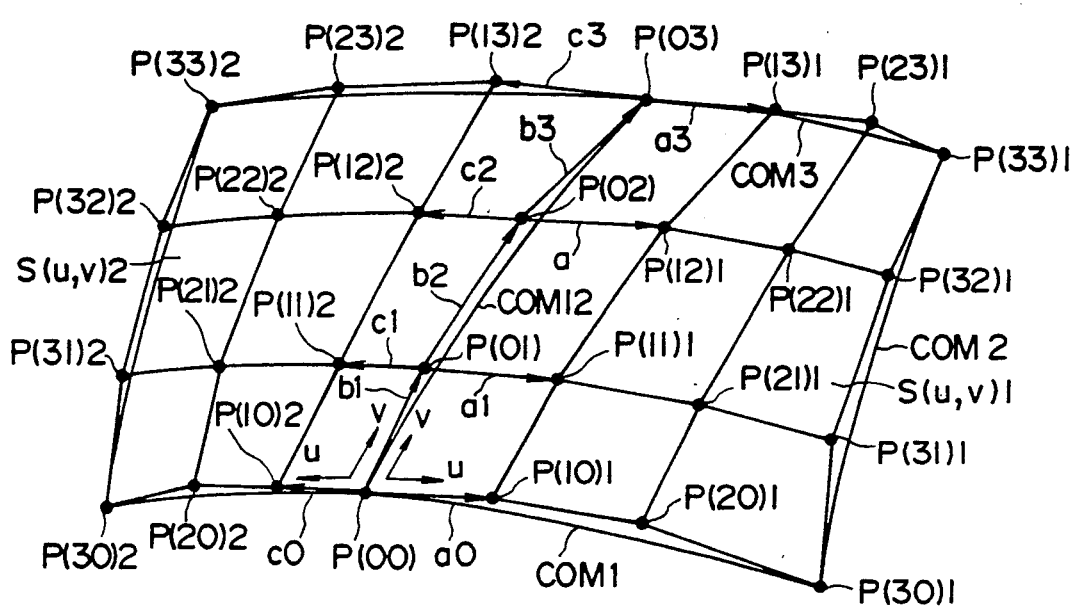
FIG. 19 is a schematic view depicting how patches of a target object are connected.
Figure 20:
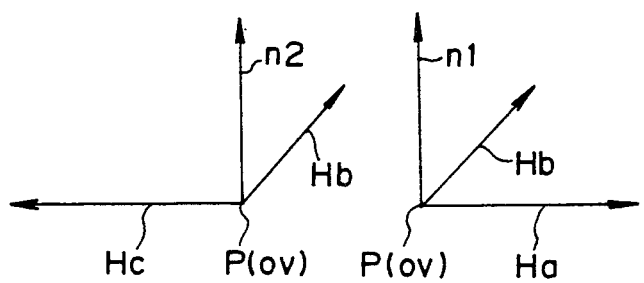
FIG. 20 is a schematic view indicating how tangent plane continuation occurs in connection with the invention.

As shown in FIG. 18, the sculptured surface generating device 12 starts its operation in step SP60 and goes to step SP61. As with partial volume measurement, the projection surface K is established in step SP61.

Step SP61 is followed by step SP62 in which the sculptured surface generating device 12 checks to see if any part of the first patch S(u, v)l overlaps with the target portion. If the result of the check in step SP62 is negative, step SP63 is reached. In step SP63, the sculptured surface generating device 12 checks to see if all patches have been processed. If step SP63 yields a "NO" decision, step SP62 is again reached in which the next patch is processed.

In this manner, the sculptured surface generating device 12 measures the center of gravity of each patch within the target portion. This eventually allows the center of gravity of the operator-designated portion to be measured.

If the result of the check in step SP62 is positive, the sculptured surface generating device 12 goes to step SP64. In step SP64, the current patch is divided into parameters so as to create small regions.

Step SP64 is followed by step SP65 in which the sculptured surface generating device 12 checks to see if the small region AR(i, j) overlaps with the target portion for measurement. If the result of the check in step SP65 is affirmative, step SP66 is reached. In step SP66, sculptured surface generating device 12 measures the center of gravity and the volume of the current small region AR(i, j). Step SP66 is followed by step SP67 in which the computations of equation (16) are carried out. In step SP67, the center of gravity obtained is added as it is weighted and the measured volume is accumulated, in accordance with the orientation of the normal vector.

The sculptured surface generating device 12 goes from step SP67 to step SP68. In step SP68, a check is made to see if the centers of gravity and the volumes of all small regions have been measured. If the result of the check in step SP68 is negative, step SP65 is again reached.

Thus the sculptured surface generating device 12 checks each small region to see if it overlaps with the target portion ARK. The device 12 carries out steps SP65, SP66, SP67, SP68 and SP65, in that order (LOOP8) for each small region within the target portion ARK. The center of gravity and the volume are repeatedly measured regarding each small region. The resulting volumes and the centers of gravity weighted by the respective volumes are accumulated.

If the result of the check in step SP65 is negative, the sculptured surface generating device 12 goes to step SP69. In step SP69, a check is made to see if the current small region is outside the target portion ARK.

As described in connection with FIG. 15, the result of the check in step SP69 is affirmative if none of the dividing points P(i, j)S, P(i+1, j)S, P(i, j+1)S and P(i+1, j+i)S constituting the small region AR(i, j) is found within the target portion ARK. Then the sculptured surface generating device 12 goes to step SP68. In step SP68, a check is made to see if the volumes of all small regions have been measured. If the result of this check is negative, step SP62 is reached again.

Figure 16:
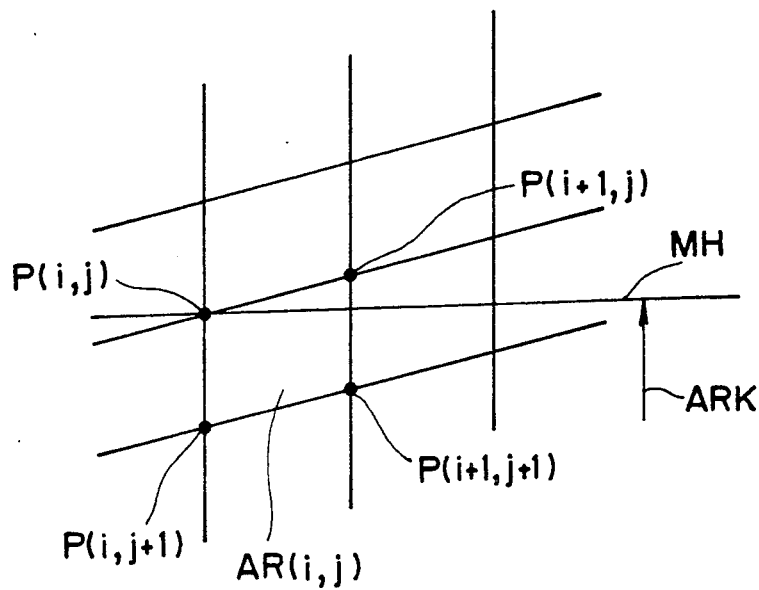
FIG. 16 is a schematic view depicting a small region partially included within a target portion for measurement.

If, as described in connection with FIG. 16, the dividing points P(i, j)S, P(i+1, j)S, P(i, j+1)S and P(i+1, j+i)S constituting the small region AR(i, j) are located across a plane traversing the target portion ARK, the result of the check in step SP69 is negative. In that case, the sculptured surface generating device 12 goes to step SP70.

In step SP70, the sculptured surface generating device 12 finds the ratio of how much of the small region AR(i, j) is contained in the target portion ARK. With the ratio obtained, the device 12 goes to step SP71. In step SP71, the center of gravity and the volume of the small region AR(i, j) are acquired. Step SP71 is followed by step SP72 in which the sculptured surface generating device 12 corrects the volume and center of gravity obtained using the ratio acquired above. Then step SP68 is reached.

The sculptured surface generating device 12 repeats LOOP8, LOOP9 (steps SP65, SP69, SP70, SP71, SP72, SP67, SP68 and SP65, executed in that order) or LOOP10 (steps SP65, SP69, SP68 and SP65, executed in that order). When the measurements about all small regions have been accumulated, a "YES" decision is made in step SP63. Then step SP62 is reached again.

When all patches have been processed, the result of the check in step SP63 becomes affirmative. In that case, the sculptured surface generating device 12 goes to step SP73. The device 12 then repeats the computations of Equation (18) to find the value of accumulated volumes VOL1 and the total volume VOL regarding the target portion. With the computations of Equation (19) carried out, the processing comes to an end.

As described, the center of gravity of each small region is measured, and the measurements are weighted by the respective volumes when added up. In turn, the result of the addition is divided by the volume of the target portion. Thus the invention as embodied above permits easy and dependable measurement of the center of gravity of a given target portion.

(3) Effects of the embodiment

As embodied in the manner described, the invention sets a projection surface, divides each patch of a target object into small regions, detects the volume of the column portion formed between each small region and projection surface, and accumulates the volume measurements with reference to the orientation of the normal vector of each small region. This makes i-t possible to measure easily and dependably the volume of the target object even if the shape of the object is complicated.

(4) Other embodiments

With the above-described embodiment, each patch of the target object is divided into 1,600 small regions for volume measurement. Alternatively, each patch may be divided into any number of small regions. Where necessary, the patch may be projected direct onto the projection surface for volume measurement.

With the above embodiment, the column portion of each small region is divided into triangular section column regions, and each column region into a triangular prism and a triangular pyramid for volume measurement. Alternatively, the column region may be approximated as a rectangular prism, a triangular prism, or any of many other shapes.

In the preceding description, the invention is embodied so as to measure the volume of a target object having a sculptured surface that is defined by a cubic Bezier equation. Alternatively, the invention may also be applied to measuring the volumes of cubic objects having sculptured surfaces otherwise defined, such as one represented by the B spline function and one constituted by a solid model.

As described and according to the invention, a virtual projection surface is established for a target object. Each of the patches constituting the object is divided into small regions. Then the volume of the column portion formed between each small region and projection surface is measured. The measured volumes are accumulated in accordance with the orientation of the normal vector to each small region. Thus even if the shape of the target object is complex, the volume thereof is measured easily and with precision.

As many apparently different embodiments of this invention may be made without departing from the spirit and scope thereof, it is to be understood that the invention is not limited to the specific embodiments thereof except as defined in the appended claims.

What is claimed is:

1. A method of interactively preparing a mold for a three-dimensional object, the object having a surface represented by predetermined shape data, said method comprising the steps of:
    displaying to an operator an image of the threedimensional object;
    receiving from the operator data designating at least a portion of the three-dimensional object;
    forming a virtual projection surface of the designated portion of said object based upon said predetermined shape data;
    dividing said surface represented by said predetermined shape data into small regions;
    detecting the volume of a column portion extending from each of said small regions toward said projection surface;
    detecting a normal to each of said small regions;
    determining the volume of the designated portion of said object by subtracting the volume of said column portion of a small region when the normal thereto is oriented toward said projection surface from the volume of said column portion of a small region when the normal thereto is oriented away from said projection surface; and
    displaying to the operator data representative of the volume of said object and in response to operator input generating manufacturing data from the predetermined shape data; and
    milling raw material based upon the manufacturing data to form a mold corresponding to the three-dimensional object.

2. A method of interactively preparing a mold for a three-dimensional object, the object having a surface represented by predetermined shape data, said method comprising the steps of:
    displaying to an operator an image of the three-dimensional object;
    receiving from the operator data designating at least a portion of the three-dimensional object;
    forming a virtual projection surface of the designated portion of said object based upon said predetermined shape data;
    dividing said surface represented by said predetermined shape data into small regions;
    detecting the center of gravity of a column portion extending from each of said small regions toward said projection surface;
    detecting a normal to each of said small regions; and
    determining the center of gravity of the designated portion of said object by accumulating said center of gravity while concurrently weighting it with the volume of the current small region, said accumulating and said weighting being performed in accordance with the orientation of the normal from each small region to said projection surface, said orientation being in one of two directions, one direction being toward and the other being away from said projection surface; and
    displaying to the operator data representative of the center of gravity of said object and in response to operator input generating manufacturing data from the predetermined shape data; and
    milling raw material based upon the manufacturing data to form a mold corresponding to the three-dimensional object.

3. A method according to claim 1 or 2, wherein each of said small regions comprises a triangular prism and a triangular pyramid.

* * * * *